US007975393B2

(12) United States Patent
Sparrow

(10) Patent No.: US 7,975,393 B2
(45) Date of Patent: Jul. 12, 2011

(54) SPIRIT LEVEL

(76) Inventor: Paul Andrew Sparrow, Weymouth (GB)

( * ) Notice: Subject to any disclaimer, the term of this patent is extended or adjusted under 35 U.S.C. 154(b) by 0 days.

(21) Appl. No.: 12/296,276

(22) PCT Filed: Apr. 10, 2007

(86) PCT No.: PCT/GB2007/001324
§ 371 (c)(1),
(2), (4) Date: Feb. 25, 2009

(87) PCT Pub. No.: WO2007/128992
PCT Pub. Date: Nov. 15, 2007

(65) Prior Publication Data
US 2009/0320303 A1 Dec. 31, 2009

(30) Foreign Application Priority Data

Apr. 7, 2006 (GB) .................................. 0606924.9
Sep. 11, 2006 (GB) .................................. 0617796.8

(51) Int. Cl.
*G01C 9/32* (2006.01)
*B60Q 1/068* (2006.01)
(52) U.S. Cl. ............................. 33/348; 33/379; 33/390
(58) Field of Classification Search .................... 33/348, 33/379, 390
See application file for complete search history.

(56) References Cited

U.S. PATENT DOCUMENTS

| 159,882 | A | * | 2/1875 | Barnes | 33/348 |
| 385,597 | A | * | 7/1888 | Crouse | 359/439 |
| 2,466,829 | A | * | 4/1949 | Sprinkel | 33/348 |
| 2,514,492 | A | * | 7/1950 | Hayward | 33/348 |
| 2,727,314 | A | * | 12/1955 | Dossie et al. | 33/348 |
| 2,750,677 | A | * | 6/1956 | Wirth | 33/333 |
| 2,791,036 | A | * | 5/1957 | Gericke | 33/348 |
| 3,052,036 | A | * | 9/1962 | Oliver | 33/334 |
| 3,618,222 | A | * | 11/1971 | Ostrager | 33/348 |
| 3,694,090 | A | | 9/1972 | Ohyama | |
| 3,724,087 | A | * | 4/1973 | Ostrager | 33/348 |
| D243,931 | S | * | 4/1977 | Pitkin et al. | D10/69 |
| 4,082,466 | A | | 4/1978 | Underberg | |

(Continued)

FOREIGN PATENT DOCUMENTS

DE        3248475 A1    7/1984

(Continued)

OTHER PUBLICATIONS

International Search Report dated Oct. 24, 2007, issued in corresponding International Application No. PCT/GB2007/001324, filed Apr. 10, 2007.

(Continued)

*Primary Examiner* — Christopher W Fulton
(74) *Attorney, Agent, or Firm* — Christensen O'Connor Johnson Kindness PLLC

(57) ABSTRACT

A spirit level (1) comprises a planar base (14) for resting, in use, on a surface whose level is to be determined, and levelling means (27) comprising a vial (41) filled with sufficient liquid that an air bubble (47) is formed within the vial (41). The spirit level (1) comprises indicia (43, 45) relative to which the bubble (47) moves as the orientation of the spirit level (1) is altered so as to indicate the orientation of the spirit level. Optical means (29) is provided on the spirit level (1) to provide an image indicative of the position of the bubble (47) relative to the indicia (43, 45).

20 Claims, 7 Drawing Sheets

U.S. PATENT DOCUMENTS

| | | | |
|---|---|---|---|
| 4,164,077 A | | 8/1979 | Thomas |
| 4,928,395 A | | 5/1990 | Good |
| 4,970,796 A | | 11/1990 | Masters |
| 5,442,864 A | * | 8/1995 | Erman .......................... 33/376 |
| 6,449,859 B1 | * | 9/2002 | Zugel et al. ..................... 33/451 |

FOREIGN PATENT DOCUMENTS

| | | |
|---|---|---|
| DE | 8907079 U1 | 11/1989 |
| FR | 1527974 A | 6/1968 |
| FR | 1551837 A | 12/1968 |
| GB | 2254140 A | 9/1992 |
| GB | 2321520 A | 7/1998 |
| SU | 800638 A1 | 1/1981 |

OTHER PUBLICATIONS

International Search Report mailed May 11, 2009, issued in corresponding International Application No. PCT/GB2008/004048, filed Dec. 8, 2008, 5 pages.

* cited by examiner

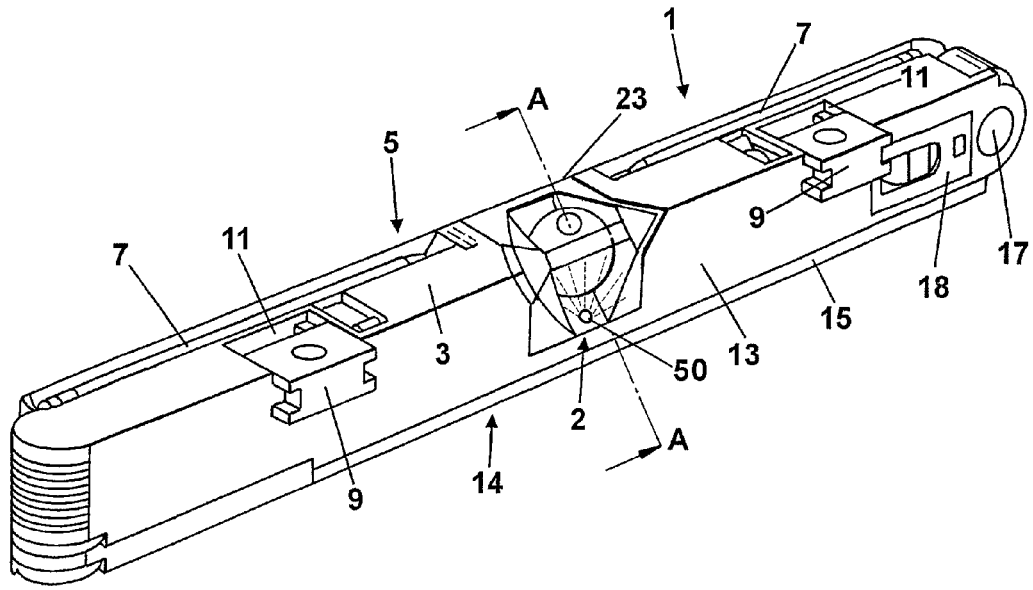
*Fig. 1*
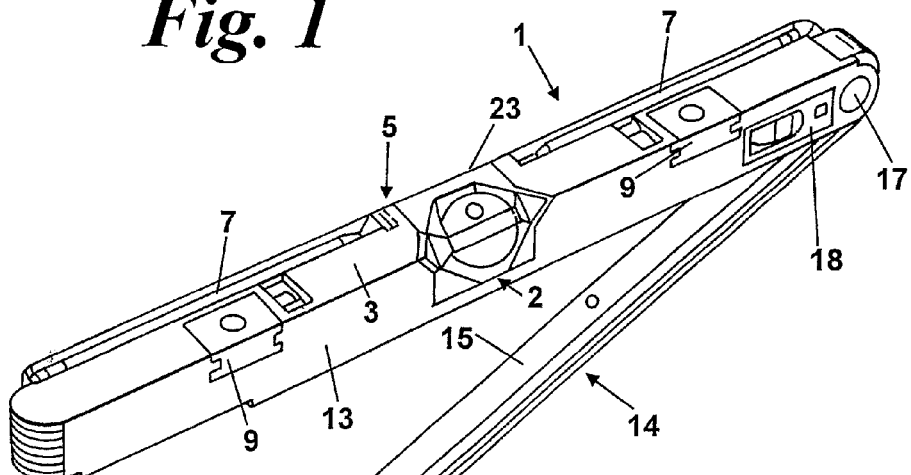
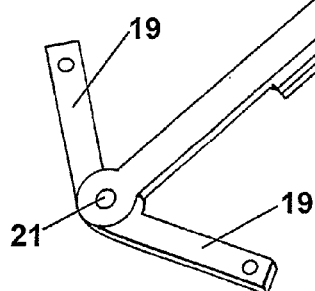
*Fig. 2*

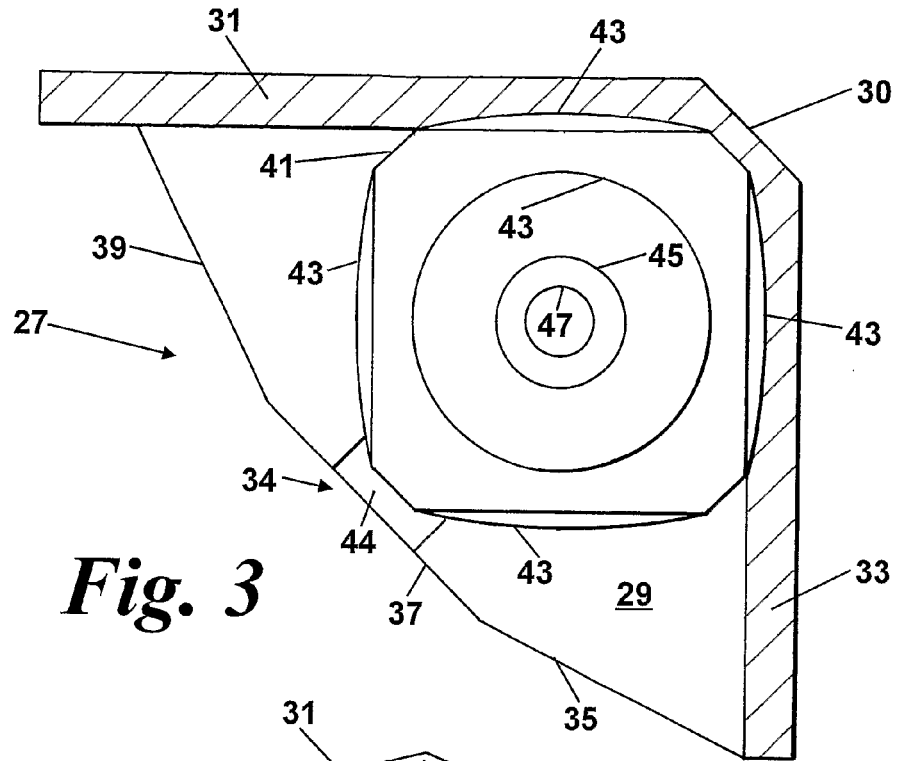
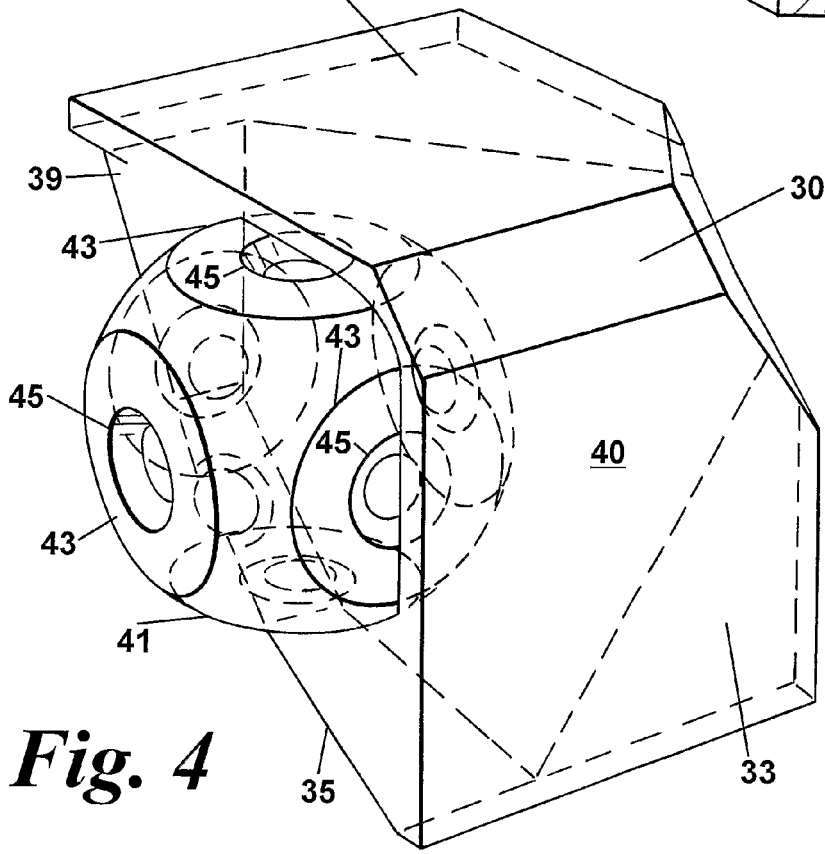

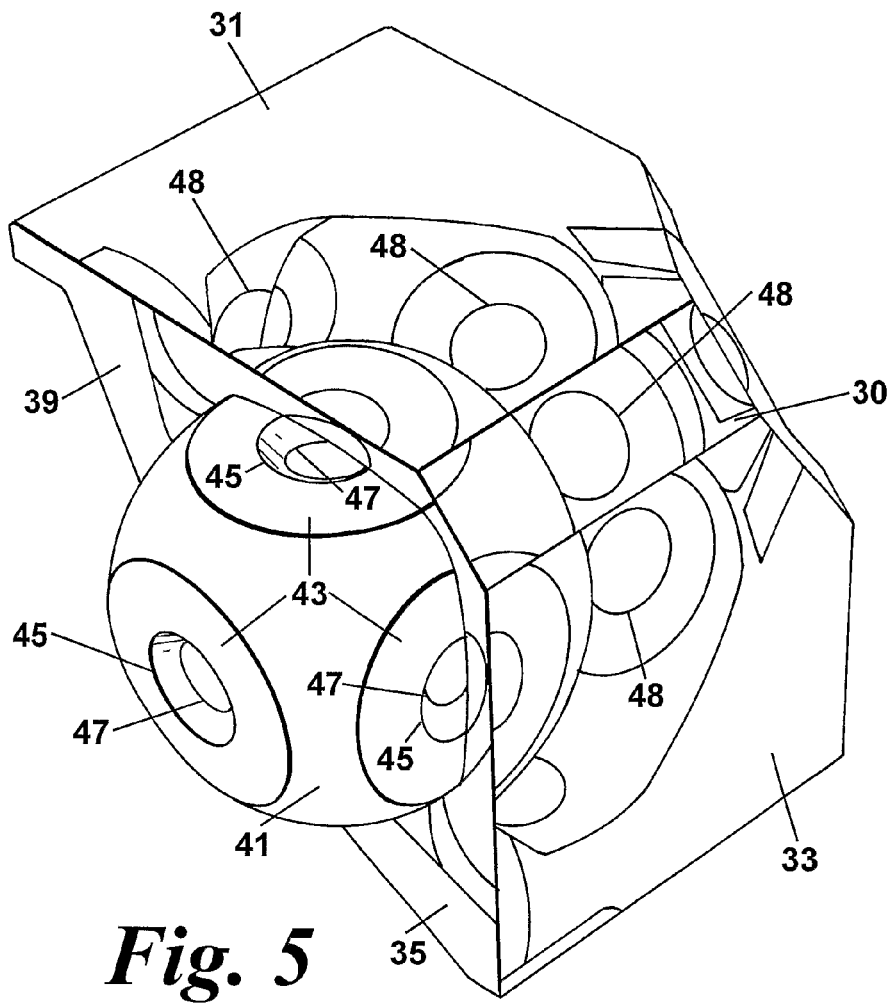
Fig. 5
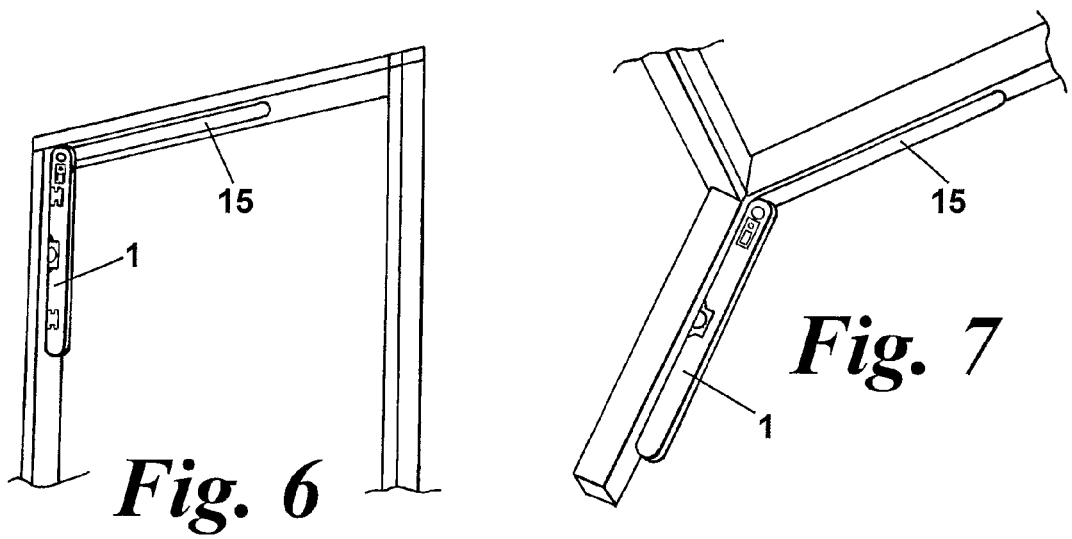
Fig. 6
Fig. 7

SPIRIT LEVEL

The present invention relates to a spirit level.

Spirit levels comprising a cylindrical liquid filled vial are well known. A bubble in the vial can be aligned with indicia marked on the vial to indicate the angle of inclination of the spirit level and typically indicate whether or not the spirit level is horizontal or vertical.

However, it can be difficult to accurately determine the position of the bubble within the vial when the user cannot directly see the front of the vial, or where the user cannot directly see the bubble at all.

According to a first aspect of the invention there is provided a spirit level comprising a planar base for resting, in use, on a surface whose level is to be determined, and levelling means comprising a vial filled with sufficient liquid that an air bubble is formed within the vial, the spirit level comprising indicia relative to which the bubble moves as the orientation of the spirit level is altered so as to indicate the orientation of the spirit level, optical means being provided on the spirit level and operative to provide an image indicative of the position of the bubble relative to the indicia.

Preferably the optical means comprises a prism operative to refract light passing through the vial, the refracted light forming the image indicative of the position of the bubble relative to the indicia.

Preferably the optical means comprises at least one surface that faces the vial and which has light reflecting properties the reflected light forming the image indicative of the position of the bubble relative to the indicia.

Preferably the prism is formed with a cavity that defines the vial.

Preferably the prism comprises a plurality of relatively inclined walls.

Preferably the prism comprises a planar front wall and a generally conical rear wall region that tapers generally radially inwardly from the planar front wall. The rear wall region therefore preferably extends around the rear of the vial so as to partially surround the vial.

Preferably the top wall of the prism is planar. In one embodiment the front and top walls are substantially perpendicular, although the front walls may alternatively be at an obtuse angle.

Preferably the vial comprises a plurality of indicia positioned on different parts of the vial so that the bubble in the vial can be aligned with whichever indicia that can most clearly be seen.

Preferably the vial is substantially spherical. Most preferably the vial comprises a plurality of flattened regions, the flattened regions each forming or comprising indicia.

Preferably the flattened regions are arranged in pairs, the flattened regions in each pair being spaced apart and opposed, each pair being perpendicular to the other pairs.

Preferably each flattened region is of substantially circular outline.

Preferably each flattened region comprises an inner region, the periphery of which comprises further indicia.

Preferably the inner region is also of circular outline.

Preferably alignment means are provided operative to omit a signal when the level is substantially aligned with a desired angle. Preferably the signal is an audible signal.

Preferably light emitting means are provided to illuminate the vial.

Preferably the light emitting means comprises part of, or is linked to, the alignment means so as to be operative to emit a light signal indicative of the degree of alignment of the spirit level with a desired angle.

Preferably the light emitting means is operative to emit a different light signal for differing degrees of alignment. Most preferably the light signals are differentiated by colour.

Preferably the planar base comprises an arm that is rotatable relative to the base such that the arm can be retracted so as to be aligned with the planar base and extended so that the longitudinal axis of the arm is not parallel with the longitudinal axis of the planar base.

Preferably an angle indicator is provided to indicate the angle between the longitudinal axis of the level and the longitudinal axis of the arm.

Preferably one end of the arm is provided with retractable feet that can be folded from a position flush with the margins of the arm, to a position flared outwardly from the arm.

Preferably retractable sliding blocks are provided which when in a non-retracted position enable the spirit level to be used as a set square.

Preferably the levelling means is formed integrally with the spirit level.

Preferably the spirit level comprises a plurality of levelling means.

Preferably the vial is integrally moulded into the spirit level.

Other aspects of the present invention may include any combination of the features or limitations referred to herein.

The present invention may be carried into practice in various ways, but embodiments will now be described by way of example only with reference to the accompanying drawings in which:

FIG. 1 is a perspective view of a spirit level in accordance with the present invention;

FIG. 2 is a perspective view of the spirit level of FIG. 1 with part of the spirit level in a partially extended condition;

FIG. 3 is a sectional view of part of the spirit level of FIG. 1 taken along line A-A of FIG. 1 with some of the spirit level being omitted for clarity;

FIG. 4 is a perspective, part cut-away view of the part of the spirit level of FIG. 3;

FIG. 5 is a perspective, part cut-away view of the part of the spirit level of FIG. 3 in use;

FIG. 6 is a perspective view of the spirit level of FIGS. 1 to 5 in use in a first condition;

FIG. 7 is a perspective view of the spirit level of FIGS. 1 to 5 in use in a second condition;

Figure 8:
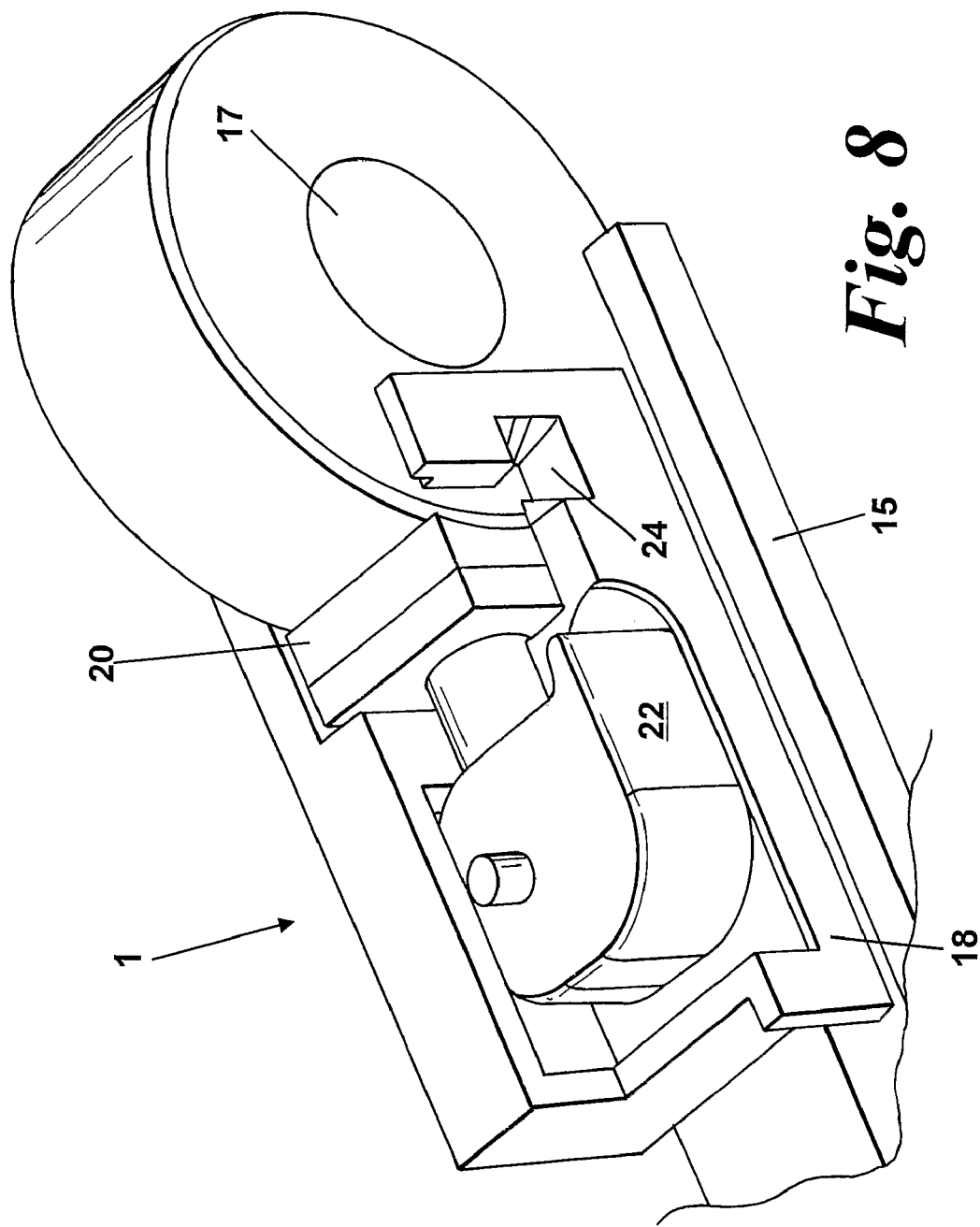
FIG. 8 is an enlarged part cut-away perspective view of one end of the spirit level of FIGS. 1 to 7.

Referring initially to FIGS. 1 and 2, a spirit level 1 is of generally oblong form. The rectangular top surface 3 of the level 1 is substantially planar and is formed, adjacent its rear margin 5, with two elongate recesses 7 for receiving and storing a writing implement such as a pencil or pen for example. The top surface 3 is also formed with generally cuboid sliders 9 that can be slid into and out of corresponding slots 11 that open onto the front surface 13 of the level 1. The level 1, when the sliders 9 are in the extended position shown in FIG. 2, can be used as an adjustable set square.

The underside of the level 1 forms in use a planar surface 14 that rests on a surface whose level is to be determined/adjusted. The planar surface 14 is formed by the underside of a retractable arm 15 that extends along the entire length of the housing 3. One end of the arm 15 is hinged 17 to one end of the spirit level 1 so that the arm 15 can rotate about an axis that is substantially parallel to the rectangular top surface 3 and to the planar surface 14.

Referring additionally to FIG. 8, a button or lever operated locking mechanism 18 is provided on the front surface 13 of the level 1 to lock the arm 15 in a desired position. The locking mechanism 18, in this example, comprises a friction pad 20 that can be pressed, by rotating lever 22, into engagement with the hinged part of the arm 15 to resist the arm 15 being further rotated. Angle indicator means comprising angle markings (not shown) on the hinge 17 and an angle markings viewing window 24 are provided to indicate to the user the angle of the longitudinal axis of the arm 15 relative to the longitudinal axis of the housing 3.

The arm 15 may be rotated up to 180° from the longitudinal axis of the housing 3, and two possible magnitudes of rotation are shown in FIGS. 6 and 7 where it can be seen that the relative angles of part of a window or door frame or the like may be determined using the angle indicator means.

The other end of the arm 15 to the hinge 17 is formed with two retractable feet 19 that are rotatably mounted 21 on the arm 15 so as to be able to rotate in the plane of the arm 15 from a retracted position to an extended position in which the feet 19 can be rotated up to 90° from the longitudinal axis of the arm 15. The retractable feet 19 can be used to stabilise the spirit level 1 when in use on patios or the like, and can also be used with templates to form a particular, desired angle that can be transferred directly to other materials such as a paving slab for example.

A centre portion of the level 1 is formed with a recess 23 that extends from the top surface 3 and the front surface 13 into the body of the level 1 and terminates in a rear wall that is substantially at 45° to the outer surfaces 3, 13. The recess 23 is therefore of substantially triangular transverse cross section when viewed in a direction along the longitudinal axis of the housing 3.

Levelling means 27 is located in the recess 23.

Referring additionally to FIGS. 3 to 5, the levelling means 27 comprises optical means in the form of a prism 29 of generally triangular transverse cross section. The prism 29 is formed with a generally spherical cavity that defines a vial 41 that can be filled with a liquid. The top and front planar rectangular walls 31, 33 of the prism 29 are substantially perpendicular to one another and enable the vial 41 to be visible externally. The uppermost and forwardmost intersection between the top and front walls 31, 33 of the prism 29 comprises an oblong strip 30 that is at substantially 45° to the top and front walls 31, 33 and extends across the width of the prism 29.

The rear of the prism 29 tapers inwardly and downwardly from the top and front walls 31, 33 so as to be of generally conical form. When viewed from the front of the prism 29, the rear of the prism 29 comprises a central rear wall 34 that comprises three rectangular sub-walls 35, 37, 39, the middle sub-wall 37 being at substantially 45° to the top and front walls 31, 33. The outer sub-walls 35, 39 taper towards the upper and front walls 31, 33 at an angle of less than 45°. The rear wall 34 of the outer prism 29 therefore generally inclines between the top and front walls 31, 33, so that the outer prism 29 is of substantially triangular transverse cross section that corresponds to the cross section of the recess 23 in the housing 3 so that the outer prism 29 can be received and secured in the recess 23.

The rear wall of the prism 29 also comprises a side sub-wall 40 on each side of the central rear wall 34. Each side sub-wall 40 is substantially rhomboid and is inclined outwardly from the central rear wall 34 to the side margins of the prism 29 as can best be seen in FIG. 4.

The vial 41 is defined behind the front wall 33 in the centre of the cavity formed in the prism 29. The middle sub-wall 37 of the central rear wall 34 of the prism 29 is formed with a bore 44 through which liquid can be pumped to fill the vial 41. A plug, not shown, is provided to seal the bore 43 when sufficient liquid has been pumped into the vial 41, sufficient liquid being pumped when the vial 41 is substantially full of liquid but an air bubble 47 remains.

The vial 41, in this example, is of a generally spherical shape but where six moulded circular regions 43 of the outer surface of the sphere have been substantially flattened. In this example, the flattened regions 43 are in fact domed, but have a larger radius of curvature than the radius of the spherical vial 41. The flattened circular regions 43 are arranged in pairs, the regions 43 in each pair being opposed so as to be on opposite sides of the vial 41, each pair being substantially perpendicular to the other pairs. It will be appreciated that the circular regions 43 face to the front, the rear, both sides, the top and the bottom of the spirit level 1. The vial 41 may, for example, be tubular.

Each circular region 43 further comprises a coaxial, moulded inner ring region 45. The periphery of the circular regions 43 and 45 comprise indicia that are used to determine the inclination of the spirit level 1 with reference to the position of the bubble in the vial relative to the indicia 43, 45. The indicia may additionally or alternatively comprise etchings or printed markings to enhance the visibility of the indicia 43, 45.

The internal surfaces of the vial 41 are at least partially reflective and are arranged to reflect light incident on those surfaces at various angles away from the longitudinal axis of the level 1. The internal surfaces 35 to 40 may, for example, be formed from a material having naturally reflective or partially reflective properties, or from a material that is coated with a reflective or mirrored coating to enhance the reflective properties of the internal surfaces.

The prism 29 refracts light incident on, or passing through, the vial to produce an image of the bubble 47 relative to the indicia 43, 45 that is directed at various angles away from the spirit level 1, and particularly, is directed at acute angles away from the spirit level 1. The reflective surfaces also generate reflected images 48 of the bubble 47 relative to the indicia 43, 45.

In use, the planar underside 14 of the arm 15 of the level 1 is placed on a surface whose level is to be determined. The bubble 47 in the vial 41 will move to a given position within the vial 41 and that position can be determined with reference to the circular indicia 43, 45. If the user of the level 1 is directly in front of the vial 41 then the user can simply look directly at the vial 41 to determine the position of the bubble 47 relative to the indicia 43, 45 to determine the inclination of the level 1.

However, if the user is positioned so (s)he is looking at the vial 41 from above, below or to one side of the vial 41, then the position of the bubble 47 relative to the circular indicia 43, 45 can be determined by either looking directly at the bubble and the circular indicia 43, 45 that are not facing the front of the level 1, or by looking at an image of the bubble 47 and the rear or side indicia 43, 45 as refracted by the prism 29 or as reflected from the internal surfaces 35 to 40 of the prism 29. The images can be seen with reference to FIG. 5. The provision of a plurality of indicia 43, 45 at positions around the periphery of the vial 41 enhances the angle at which either the bubble and indicia 43, 45 can be directly viewed, or the reflected or refracted image of the bubble 47 relative to the indicia 43, 45 can be viewed. This enables the inclination of the spirit level 1 to be determined at a wider range of viewing angles from existing spirit levels.

Alignment detection means may be provided to provide the user with a signal when the bubble 47 is lined up within the inner circular indicia 45 on the vial 41, ie when the level 1 is horizontal or vertical. The detection means could, for example, comprise a balance sensor operative to control a signal emitter such as a buzzer.

Level indicating means could be provided in the form of a light emitter 50 mounted in or on the level 1 to illuminate the vial 41. The light emitter 50 could comprise any suitable bulb, bulbs or LEDs that could, for example, extend into the cavity of the vial housing 29. The light emitter 50 could be linked to or comprise part of the alignment detection means so as to emit light indicative of the alignment, or degree of alignment, of the level 1 to the vertical or horizontal or of the bubble 47 with the circular indicia 43, 45 on the vial 41. Differently coloured light emitters could be provided indicative of differing levels of alignment. So, for example, a green light could be provided to indicate good alignment, an amber light to indicate lesser alignment, and a red light to indicate poor alignment.

The above described spirit level 1 may additionally and optionally incorporate a pencil sharpener, and/or a detachable extension piece to extend the overall length of the level 1. A laser angle splitter may additionally be provided to produce a laser beam that bisects the total angle of rotation between the longitudinal axis of the arm 15 and the longitudinal axis of the spirit level 1, when the arm 15 is extended. This enables the laser beam to be used to mark a desired cut line on another material. So for example the laser beam could be used to mark a desired cut line on a length of wood forming part of a window frame so as to achieve the desired mitre.

The vial 41 could be any desired shape that enables the position of the bubble relative to the indicia 43, 45 to be viewed from the desired angle. The vial 41 could therefore be tubular, cuboid, spherical, elliptical, or any other shape formed from a combination of these shapes.

Additionally the prism 29 could also be any desired shape and comprise any number, shape, size and orientation of walls. The walls may, for example, be at 45° to one another so as to define, for example a hexagonal vial 41.

Figure 9:
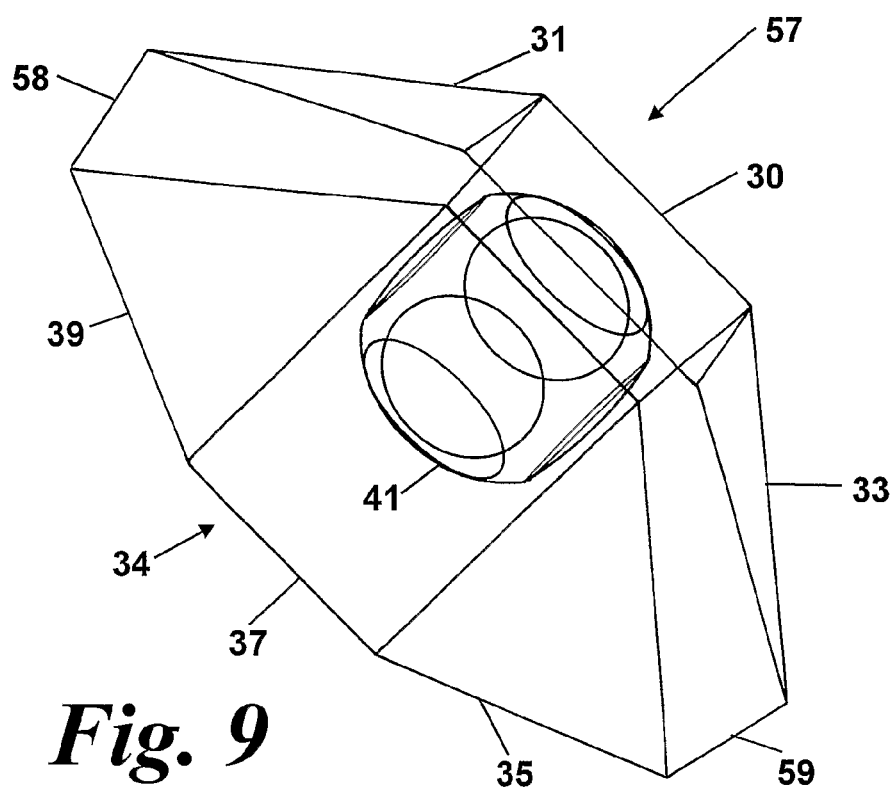
FIG. 9 is a perspective view of part of a modified spirit level in accordance with the present invention.

Referring to FIG. 9, a modified levelling means 57 comprises a wider front strip 30, and top and front walls 31, 33 that are at a relative angle of 90°. The top and front walls 31, 33 are joined to respective outer sub-walls 39, 35 by intermediate, inclined sub-wall portions 58, 59. Thus, this modified levelling means 57 provides a wider vial viewing angle than the levelling means 27 described above.

Figure 10:
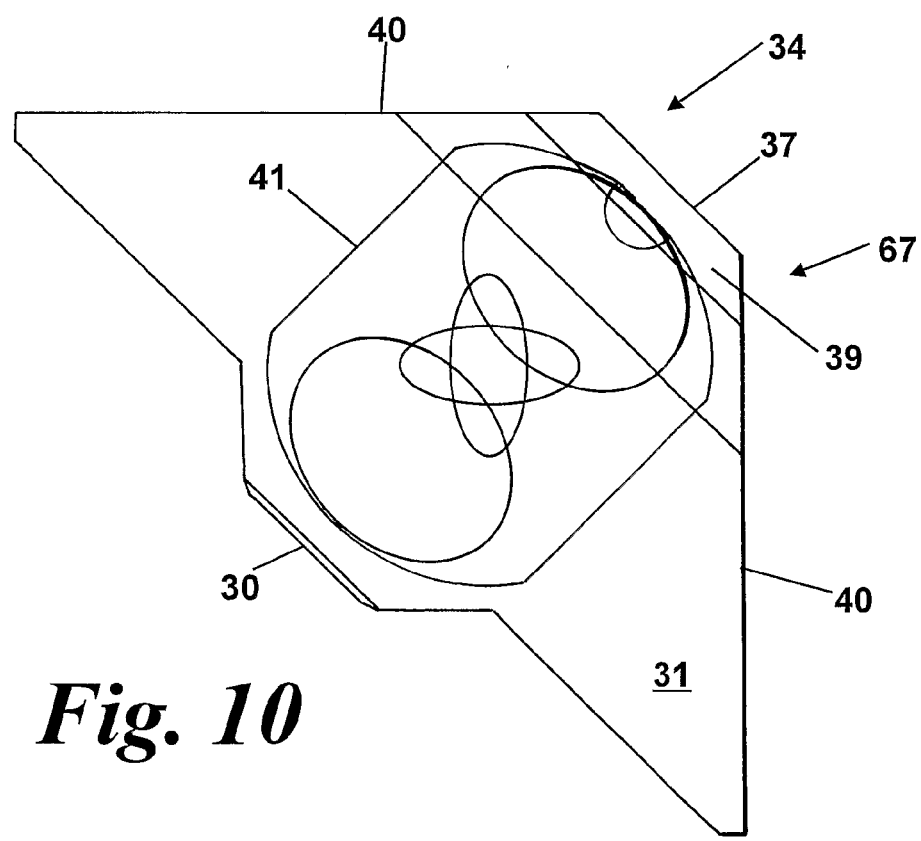
FIG. 10 is a side view of part of another modified spirit level in accordance with the present invention.

Referring to FIG. 10, another modified levelling means 67 comprises the vial 41, the longitudinal axis of which extends perpendicularly away from the oblong front strip 30. The ends of the oblong front stip 30 have been lowered to widen the angle of reflection of the vial bubble image. In this example, the outer rear sub-walls 35, 39 meet.

Figure 11:
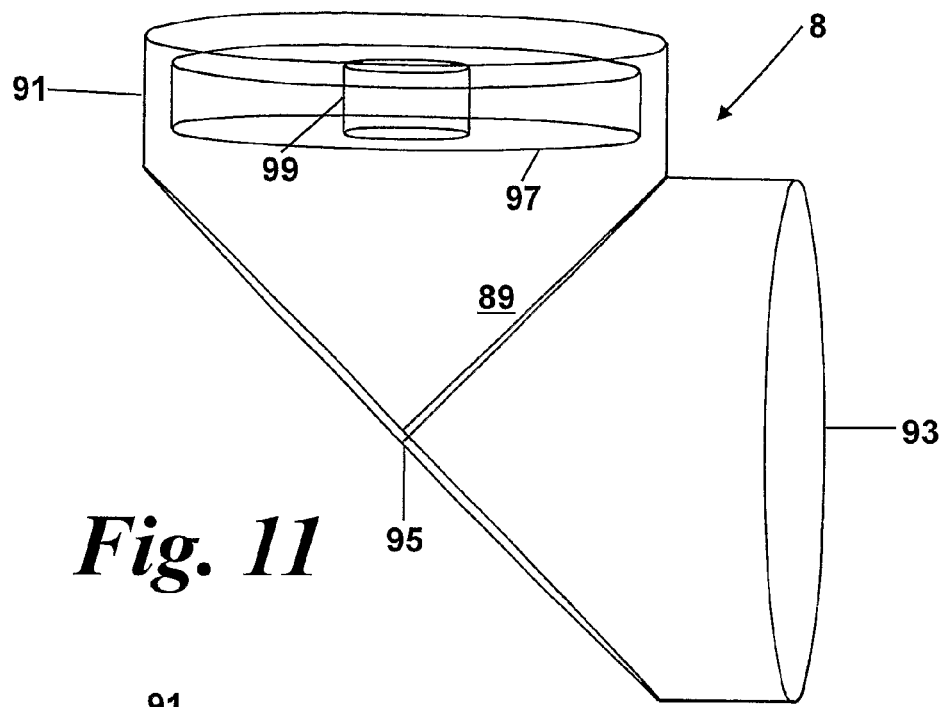
FIG. 11 is a side view of part of a further spirit level in accordance with the present invention.
Figure 12:
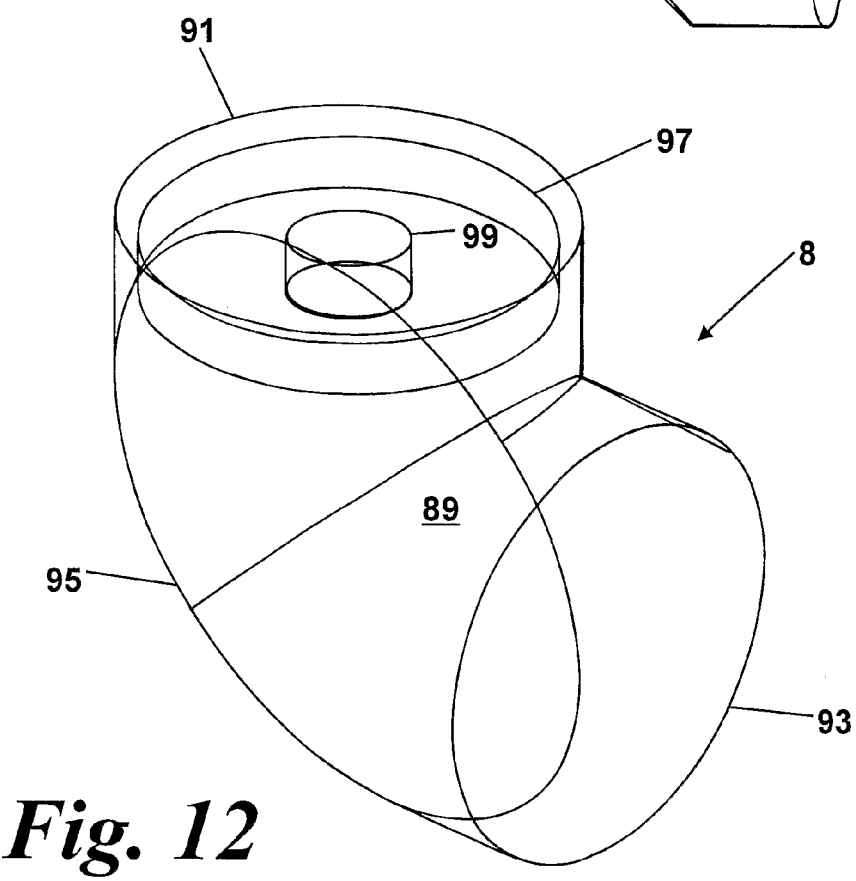
FIG. 12 is a perspective view of part of the further spirit level of FIG. 11.
Figure 13:
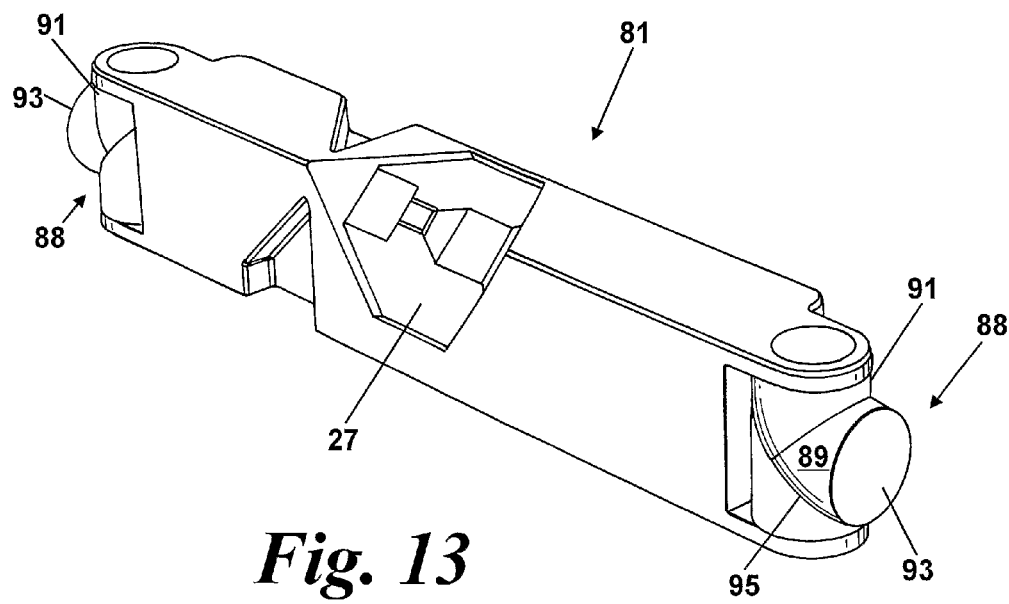
FIG. 13 is a perspective view of the further spirit level of FIGS. 11 and 12.

Referring to FIGS. 11, 12 and 13 a modified spirit level 81 comprises a primary levelling means 27 and further levelling means 88 are mounted at each end of the spirit level 1 comprising a prism 89 comprising two perpendicular cylindrical portions 91, 93 that terminate at a mutual, planar inclined rear wall 95. A cylindrical vial 97 is provided in the upper cylindrical portion 91 and comprises indicia in the form of a cylinder 99 formed within the vial 97. This spirit level thus comprises three levelling means.

The two additional levelling means 88 can rotate through 180° about a respective pivot axis perpendicular to the spirit level longitudinal axis.

In use, the alignment of the bubble in the vial 97 relative to the indicia 99 is reflected by the prism 89 to project an image of the bubble and indicia 99 through the lower cylindrical portion 93, that is, substantially at 90° to the real bubble and indicia 99.

In this example the spirit level and primary levelling means 27 are formed integrally from a translucent or transparent material. Thus the walls of the prism of the levelling means are cut into the body of the level itself. This can improve the accuracy of the level because the spirit vial 41 cannot move relative to the level.

Figure 14:
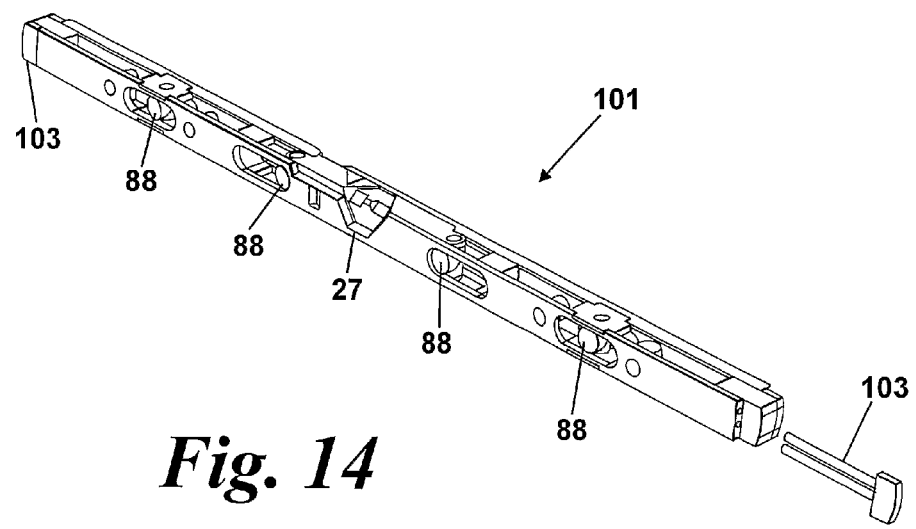
FIG. 14 is a perspective view of another spirit level in accordance with the present invention.

Referring to FIG. 14 another spirit level 101 comprises a primary levelling means 27 and a plurality of additional levelling means 88. This spirit level 101 is longer than the previously described spirit levels and comprises a plurality of different sections that can be joined together as required by the user. The spirit level 101 is thus modular. Vice grips 103 are provided so as to be extendible from each end of the spirit level 101 to hold the level against the piece of material being levelled. A carrying strap (not shown) is also provided.

The invention claimed is:

1. A spirit level comprising an oblong body comprising a planar base for resting, in use, on a surface whose level is to be determined, a planar top surface substantially parallel to the planar base, and a planar front surface substantially perpendicular to the planar base and planar to surface, the spirit level further comprising levelling means comprising a vial filled with a sufficient liquid that an air bubble is formed within the vial, the spirit level comprising indicia relative to which the bubble moves as the orientation of the spirit level is altered so as to indicate the orientation of the spirit level, optical means being provided on the spirit level and operative to provide an image indicative of the position of the bubble relative to the indicia, a portion of the level being formed with a recess that extends from the top surface and the front surface into the body of the level and comprises at least one surface comprising the optical means, the at least one surface facing the vial and having light reflecting properties, the reflected light forming the image indicative of the position of the bubble relative to the indicia, the at least one surface being planar, the plane of the at least one surface being inclined to both the top and the front surfaces of the level.

2. A spirit level according to claim 1 wherein the optical means comprises a prism operative to refract light passing through the vial, the refracted light forming the image indicative of the position of the bubble relative to the indicia.

3. A spirit level according to claim 2 wherein the prism is formed with a cavity that defines the vial.

4. A spirit level according to claim 2 wherein the prism comprises a plurality of relatively inclined walls.

5. A spirit level according to claim 2 wherein the top wall of the prism is planar.

6. A spirit level according to claim 1 wherein the vial comprises a plurality of indicia positioned on different parts of the vial so that the bubble in the vial can be aligned with whichever indicia that can most clearly be seen.

7. A spirit level according to claim 1 wherein the vial is substantially spherical.

8. A spirit level according to claim 7 wherein the vial comprises a plurality of flattened regions, the flattened regions each forming or comprising indicia.

9. A spirit level according to claim 8 wherein the flattened regions are arranged in pairs, the flattened regions in each pair being spaced apart and opposed, each pair being perpendicular to the other pairs.

10. A spirit level according to claim 8 wherein each flattened region is of substantially circular outline.

11. A spirit level according to claim 8 wherein each flattened region comprises an inner region, the periphery of which comprises further indicia.

12. A spirit level according to claim 11 wherein the inner region is also of circular outline.

13. A spirit level according to claim 1 wherein alignment means are provided operative to emit a signal when the level is substantially aligned with a desired angle.

14. A spirit level according to claim 1 wherein light emitting means are provided to illuminate the vial.

15. A spirit level according to claim 14 wherein the light emitting means comprises part of, or is linked to, the alignment means so as to be operative to emit a light signal indicative of the degree of alignment of the spirit level with a desired angle.

16. A spirit level according to claim 15 wherein the light emitting means is operative to emit a different light signal for differing degrees of alignment.

17. A spirit level according to claim 1 wherein the levelling means is formed integrally with the spirit level.

18. A spirit level according to claim 1 comprising a plurality of levelling means.

19. A spirit level according to claim 1 wherein the vial is formed integrally with the spirit level.

20. A spirit level comprising an oblong body comprising a planar base for resting, in use, on a surface whose level is to be determined, a planar top surface substantially parallel to the planar base, and a planar front surface substantially perpendicular to the planar base and planar top surface, and levelling means comprising a vial filled with sufficient liquid that an air bubble is formed within the vial, the spirit level comprising indicia relative to which the bubble moves as the orientation of the spirit level is altered so as to indicate the orientation of the spirit, wherein alignment means are provided operative to emit a signal when the level is substantially aligned with a desired angle, light emitting means being provided to illuminate the vial, the light emitting means comprises part of, or being linked to, the alignment means so as to be operative to emit a light signal indicative of the degree of alignment of the spirit level with a desired angle, the light emitting means being operative to emit a different light signal for differing degrees of alignment.

* * * * *

UNITED STATES PATENT AND TRADEMARK OFFICE
CERTIFICATE OF CORRECTION

Page 1 of 1

PATENT NO.       : 7,975,393 B2
APPLICATION NO.  : 12/296276
DATED            : July 12, 2011
INVENTOR(S)      : P. A. Sparrow It is certified that error appears in the above-identified patent and that said Letters Patent is hereby corrected as shown below:

| COLUMN | LINE | ERROR |
|---|---|---|
| 6 | 35 | "planar to surface," should read --planar top surface,-- |
| (Claim 1, | line 5) | |

Signed and Sealed this
Twenty-first Day of August, 2012

David J. Kappos
*Director of the United States Patent and Trademark Office*